United States Patent [19]

Edele et al.

[11] Patent Number: 5,383,602
[45] Date of Patent: Jan. 24, 1995

[54] WIPER AND WASHING SYSTEM, ESPECIALLY FOR WINDOW PANES OF MOTOR VEHICLES

[75] Inventors: Reinhard Edele, Sachsenheim; Reinhard Johannes, Eberstadt-Holzern; Oldrich Krizek, Bietigheim-Bissingen; Eckhardt Schmid, Brackenheim, all of Germany

[73] Assignee: SWF Auto-Electric GmbH, Germany

[21] Appl. No.: 934,665

[22] PCT Filed: May 20, 1992

[86] PCT No.: PCT/EP92/01116
§ 371 Date: Jan. 22, 1993
§ 102(e) Date: Jan. 22, 1993

[87] PCT Pub. No.: WO92/21535
PCT Pub. Date: Dec. 10, 1992

[30] Foreign Application Priority Data

May 25, 1991 [DE] Germany ............... 4117109

[51] Int. Cl.6 ............... B60S 1/52; B60S 1/46
[52] U.S. Cl. ............... 239/284.1; 239/450; 239/600; 15/250.04; 15/250.01; 285/28; 285/137.1
[58] Field of Search ........... 15/250.01, 250.02, 250.03, 15/250.04, 250.35; 239/284.1, 284.2, 450, 600; 285/25, 28, 131, 137.1

[56] References Cited

U.S. PATENT DOCUMENTS

| 2,798,745 | 7/1957 | Nelson | 285/137.1 |
| 3,418,676 | 12/1968 | Byczkowski et al. | 15/250.04 |
| 3,427,675 | 2/1969 | Tibbet | 15/250.04 |
| 3,539,106 | 11/1970 | Ramik | 239/450 |
| 4,103,936 | 8/1978 | Sutcliffe et al. | 285/131 |
| 4,920,602 | 5/1990 | Kuehbauch | 15/250.04 |

FOREIGN PATENT DOCUMENTS

| 0351527 | 1/1990 | European Pat. Off. | |
| 1084256 | 1/1955 | France | 239/450 |
| 2159967 | 6/1973 | France | |
| 2585311 | 1/1987 | France | |
| 2216752 | 10/1973 | Germany | 15/250.04 |
| 2425864 | 12/1975 | Germany | 15/250.04 |
| 3323004 | 1/1985 | Germany | 15/250.04 |
| 3907980 | 9/1990 | Germany | |
| 2206483 | 1/1989 | United Kingdom | |

Primary Examiner—David A. Scherbel
Assistant Examiner—Gary K. Graham
Attorney, Agent, or Firm—Robert P. Seitter; J. Gordon Lewis

[57] ABSTRACT

The invention relates to a wiper and washing system including a tube with two separate channels, a nozzle head with at least two washing nozzles, one of which is connected to the one channel and the other of which is connected to the other channel of the tube, and a connecting piece from which the tube starts off. In order to avoid wrong assemblies, coding the connections between the tube and the nozzle head as well as between the tube and the connecting piece are provided on the tube on the one hand, and on the nozzle head or on the connecting piece on the other hand.

10 Claims, 2 Drawing Sheets

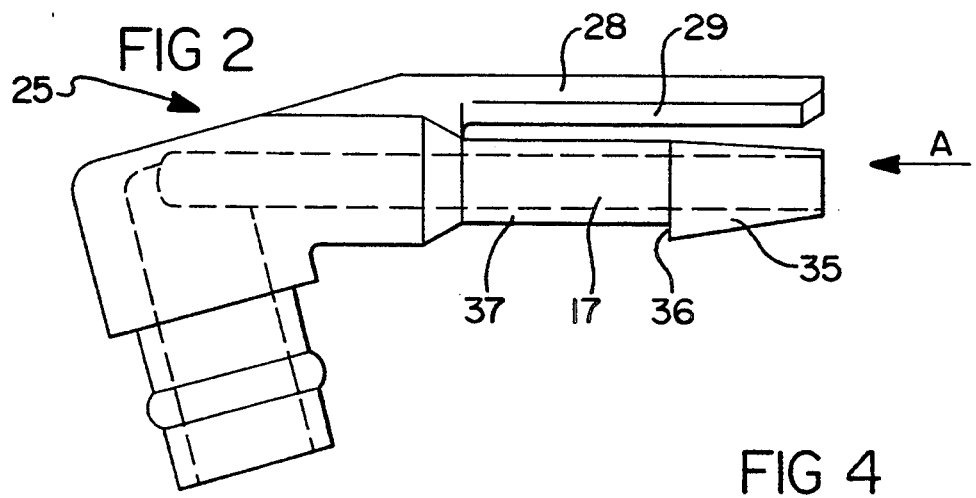
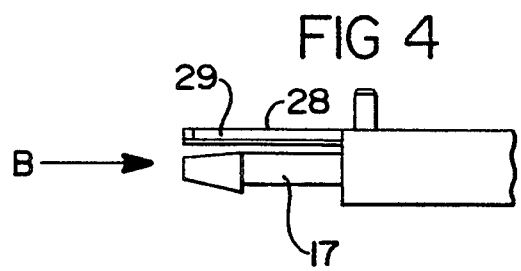
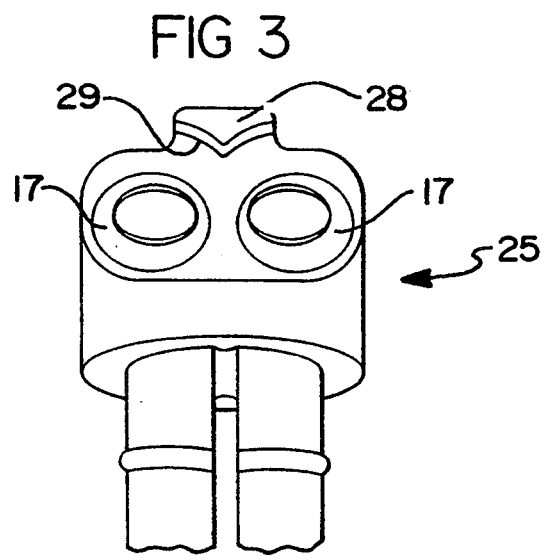
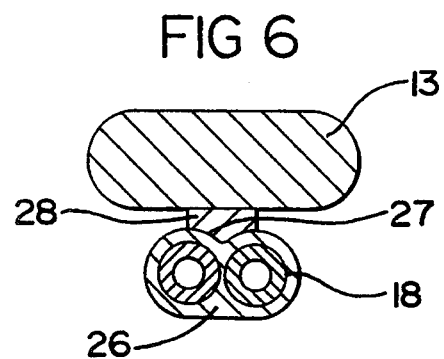
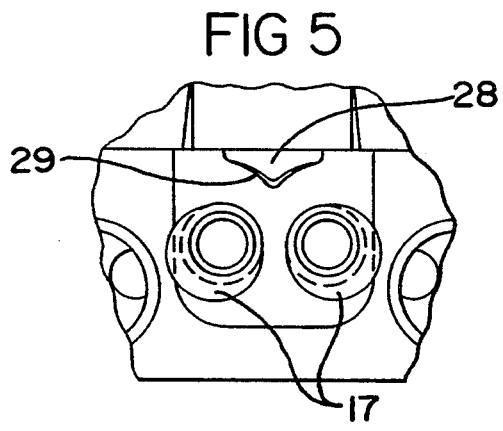
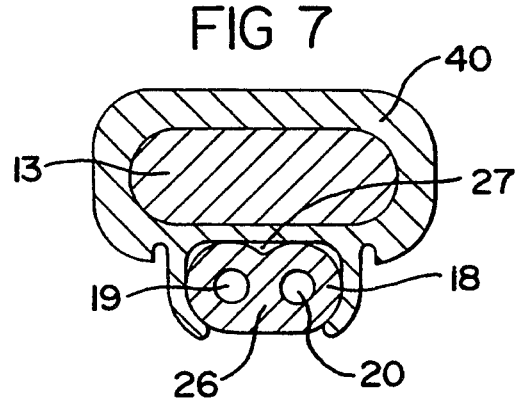

WIPER AND WASHING SYSTEM, ESPECIALLY FOR WINDOW PANES OF MOTOR VEHICLES

BACKGROUND

The invention relates to a wiper and washing system especially used for window panes of motor vehicles.

Wiper and washing systems are already known in which a nozzle head with several washing nozzles is seated at the end of a wiper arm, on which the wiper blade is swivelably mounted. The nozzle head has two pipe unions, whereby at least one washing nozzle is connected to the one pipe union and at least one other washing nozzle is connected to the other pipe union. Thus the different washing nozzles can be supplied with washing liquid independently of each other and especially when the wiper arm moves forth and back, washing liquid can be sprayed before the wiper blade. The nozzle head can be supplied with washing liquid via a tube which comprises two separate channels, is put along the wiper arm and starts off from a connecting piece located in the drive end of the wiper arm. In order to be able to provide the washing nozzles with washing liquid in the desired manner, it is necessary to connect the tube both to the connecting piece and to the nozzle head properly. Mixing up the channels might lead to the fact that washing liquid is not sprayed before, but behind the wiper blade.

SUMMARY OF THE INVENTION

The object of the invention is to develop a wiper and washing system in such a way that a proper connection of the tube to the nozzle head and to the connecting piece is highly ensured.

This object is achieved according to the invention by providing the tube on the one hand and the nozzle head and the connecting piece on the other hand, with means for coding the connections between tube and nozzle head as well as between tube and connecting piece.

Thus an embodiment is preferred, in which the forms of the coding means for making the tube engage into or lie on the nozzle head or the connecting piece are adapted to each other. By such a coding it is difficult to incorrectly put the tube onto the nozzle head or onto the connecting piece.

It is possible to form the front face of the tube and respective means on the connecting piece or on the nozzle head in such a way that the tube, when taking it in the wrong way, cannot completely be pushed onto the pipe unions. For example, the front face of the tube could be inclined with respect to its longitudinal direction and on the connecting piece or nozzle head there could be a correspondingly inclined contact area for this front face. The front face could especially be inclined in such a way that the one channel of the tube is longer than the other, whereby the pipe unions, too would have to be displaced in longitudinal direction. However, a solution in which the cross-section of the tube has an outer contour which is without symmetry, especially without double-counting symmetry, seems to be more favorable. In this case the means on the connecting piece or on the nozzle head can easily be formed in such a way that when starting to put the tube onto the connecting piece or onto the nozzle head one realizes that it has been assembled in the wrong way.

Preferably the symmetry is disturbed by a groove running in longitudinal direction of the tube. Especially there is not only a groove at the ends of the tube, but it extends along the whole tube. With respect to the position of the groove the area of a separating web between the two channels of the tube is preferred because there such a groove can be provided without weakening the channel walls.

Of course, the tube can also lead to a nozzle head fixed onto the car body of the motor vehicle. If, however, the tube is put along a wiper arm, it is of an advantage, if the side of the tube on which the groove is located, faces the wiper arm so that the groove cannot be seen.

On the connecting piece or on the nozzle head the coding means are preferably formed by a lug extending along pipe unions on the connecting piece or on the nozzle head. If the tube is provided with a groove, the lug engages into this groove.

Normally pipe unions for tubes comprise a section in which they expand like a cone at the outside and which changes into a second, more pipe-shaped section via a step. In order to maintain the original form of the tube in the area of the lug, the step is smaller in an area of a pipe union adjacent to the lug than in another area or is even totally missing.

A wiper arm of a wiper and washing system according to the invention is illustrated in the drawings. The invention is explained more in detail by way of these drawings.

DESCRIPTION OF THE DRAWINGS

FIG. 2 is a view of the connecting piece.

FIG. 3 is a view of the connecting piece in the direction of arrow A of FIG. 2.

FIG. 4 is a view of the nozzle head in the area of its pipe unions.

FIG. 5 is a view of the nozzle head in the direction of arrow B of FIG. 4.

FIG. 6 is a section taken along the line VI—VI of FIG. 1.

FIG. 7 is a section taken along the line VII—VII of FIG. 1.

DETAILED DESCRIPTION OF THE INVENTION

Figure 1:
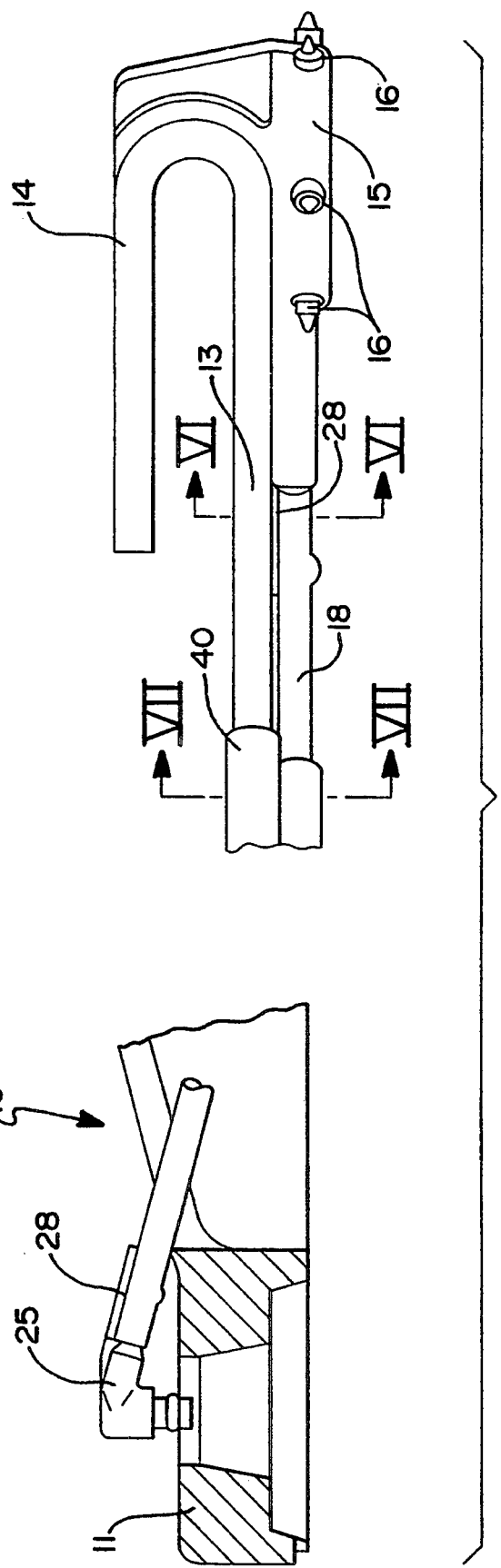
FIG. 1 is a partial view of the wiper arm with a nozzle head at its one end and with a connecting piece at its other end.

The wiper arm 10 according to FIG. 1 includes as usual a fastening member 11, by way of which it can non-rotatably be fixed onto a wiper shaft, an articulated member not illustrated any further and a wiper rod 13, the free end of which is bent in the shape of a hook 14 by way of which a wiper blade can be mounted onto wiper arm 10. In the area of the hook 14 a nozzle head 15 is fixed onto the wiper arm 10. This nozzle head 15 has a total of six washing nozzles 16, three of which are directed to the one side and three of which are directed to the other side of the wiper arm. The two groups of washing nozzles are to be supplied with washing liquid separately from each other. Therefore the nozzle head 15 has two generally parallel pipe unions sticking out of it, whereby the one group of washing nozzles is connected to the one pipe union via a channel running inside the nozzle head and the other group of washing nozzles is connected to the other pipe union 17 via another channel. A tube 18 with two channels 19 and 20 is put onto the pipe unions 17 of the nozzle head 15.

The tube 18 is put along the wiper arm 10 and starts off from a connecting piece 25 which is arranged in the area of the fastening member 11 and is provided for being put onto a pipe with two channels which goes through the hollow wiper shaft from inside to the outside of the car body of a motor vehicle. In accordance with tube 18 with two channels the connecting piece 25, just as the nozzle head 15, has two pipe unions 17 which, just as the pipe unions 17 of the nozzle head 15, are generally parallel and stick out of the connecting piece 25 and onto which the tube 18 with its channels 19 and 20 is pushed.

During operation of the wiper and washing system the washing liquid is supplied in such a way that, when swivelling the wiper arm into the one direction the one group of washing nozzles and when swivelling the wiper arm into the other direction the other group of washing nozzles sprays washing liquid onto the window pane of the motor vehicle. Thereby the group of washing nozzles is to spray, which, in the momentary direction of motion of the wiper arm, is ahead so that washing liquid is sprayed before the wiper blade. In order to ensure this, it is necessary to connect the respective pipe unions 17 of the nozzle head 15 and of the connecting piece 25 to each other. Thus a determined channel of the tube 18 has to be connected to the two respective pipe unions. Since the tube 18 is flexible, it is [easily done] easy to connect the wrong pipe union of the nozzle head 15 to a pipe union of the connecting piece 25 during assembly.

In order not to run the risk of a wrong assembly, the connection between the tube 18 and the nozzle head 15 or the pipe union 25 is coded. As it can be seen in the FIGS. 6 and 7, the tube 18 includes a groove 27 between its two channels 19 and 20 20 in the area of the separating web 26 which groove 27 extends along the whole tube 18.

The nozzle head 15 and the connecting piece 25 each includes a lug 28, which is running midway of the two pipe unions 17 and generally parallel to them and, as it can be seen in FIGS. 2 and 4, end at generally the same point as the pipe unions 17. The ridge-roof shaped lower side 29 of the lug 28 which faces the tube 18, is adapted to the cross-section of the groove 27.

The pipe unions 17 comprise a first section 35 in which they expand from their end like a cone at the outside and which changes, via a step 36, into a pipe-like second section 37 of a cross-section that is generally constant along the whole length. In order to maintain the form of the tube 18 in the area of the lug 28, the first section 35 and the second section 37 change into each other without a step in a quadrant which is adjacent to the other respective pipe union and to the lug 28. In the two quadrants adjacent to said quadrant the height of the step 36 is increased up to a certain value which is kept in the last quadrant.

Due to the lug 28 the tube can only be mounted onto the nozzle head 15 and onto the connecting piece 25 in such a way that the lug 28 enters the groove 27. When trying to mount the tube 18 in a manner rotated around 180° onto the nozzle head 15 or onto the connecting piece 25, material of the tube is pushed against the lug 28 so that, when putting the tube onto the nozzle head or onto the connecting piece in a wrong manner, this can immediately be [realised] realized and corrected. Thus wrong assemblies are excluded to a large extent.

FIGS. 1 and 7 also make clear that the wiper rod 13 is partly surrounded by a plastic coating 40, onto which at the lower side of the wiper rod 13 a channel for holding the tube 18 is integrally formed. As it can be seen in FIG. 6 as well as in FIG. 7 and as it can be gathered from FIG. 1, the groove 27 running along the tube 18 faces the wiper rod 13 after the assembly and thus cannot be seen from the outside. Accordingly the lug 28 of the nozzle head 15 is located between tube 18 and wiper rod 13 and cannot be seen from the outside either nor does it extend to the outer side of the nozzle head 15.

What is claimed is:

1. A washing system comprising:
 a connecting member, a nozzle head having at least two washing nozzle members and a tube member with two separate channels, each said channel of said tube member being connected with and fluidly coupled to a respectively associated nozzle member, said tube member including coding means for interconnecting said washing nozzle members, and said respectively associated channels of said tube member in a single predetermined orientation and preventing the interconnection of said washing nozzle members and said respectively associated tube channels in a way that deviates from said predetermined orientation,
 wherein said tube member is elongated thereby defining a longitudinal axis and a cross-section of said tube taken perpendicular through said longitudinal axis has an outer contour which is asymmetrical about said longitudinal axis,
 wherein said coding means includes a longitudinally extending groove on said tube member, and
 a male member extending from said connecting member and said nozzle head, each male member adapted to be received within said groove.

2. The washing system of claim 1, wherein each of the connecting piece and nozzle head include at least one pipe union.

3. A washing system comprising a connecting member, at least two washing nozzle members and an elongated tube member with two separate channels, each said channel of said tube member connected with and fluidly coupled to a respectively associated nozzle member, said tube member including coding means for interconnecting said washing nozzle members and said respectively associated channels of said tube member in a single predetermined orientation thereby preventing the interconnection of said washing nozzle members and said respectively associated tube channels in a way that deviates from said predetermined orientation;
 wherein said tube member has an asymmetrical transverse cross-section;
 wherein said coding means includes a longitudinally extending groove on said tube member, and a male member extending from
 said connecting member and said nozzle members in each male member adapted to be received within said groove.

4. A washing system, especially for window panes of motor vehicles, comprising:
 a tube with first and second, separate channels,
 a nozzle head with first and second washing nozzles, said first and said second washing nozzles attached to and respectively fluidly coupled with said first and second channels of said tube,
 a connecting piece having first and second passages, said first connecting piece passage fluidly coupled to said first channel of said tube and said second connecting piece passage fluidly coupled to said second channel of said tube, means, associated with said tube, said nozzle head, and said connecting piece for coding the connections between said tube and said nozzle head and between said tube and said connecting piece, wherein said coding means prevents said first nozzle head from being fluidly coupled with said second channel of said tube and also prevents said second nozzle head from being fluidly coupled with said first channel of said tube, wherein said coding means also prevents said first channel of said tube from being fluidly connected with said second passage of said connecting piece and also prevents said second channel of said tube from being fluidly connected with said first passage of said connecting piece, wherein said tube is elongated thereby defining a longitudinal axis and a cross-section of said tube taken perpendicular through said longitudinal axis has an outer contour which is asymmetrical. about said longitudinal access, and wherein the coding means includes a groove extending in the tube.

5. A washing system according to claim 4, wherein the groove is located in a separating web between the two channels of the tube.

6. A washing system according to claim 4, wherein the coding means on the connecting piece is the same as the coding means on the nozzle head.

7. A washing system according to claim 4, wherein said coding means further includes a pipe union, and a lug extending from said head, said pipe union connected to at least one of the connecting piece and the nozzle head.

8. A washing system according to claim 7, wherein the lug and the pipe union have generally the same length.

9. A washing system according to claim 7, wherein said groove is adapted to receive said lug.

10. A washing system according to claim 7, wherein the pipe union comprises a first section having an outer circumference which is tapered from a first end of said pipe union to a second end said first section terminating by way of a step, into a second section having an outer circumference, said outer circumference of said second section remaining substantially constant, and wherein an area of the pipe union proximate the lug, the step is smaller than in an area distal said lug.

* * * * *